(12) United States Patent
Wei et al.

(10) Patent No.: US 11,500,084 B2
(45) Date of Patent: Nov. 15, 2022

(54) METHOD AND APPARATUS FOR PERFORMING OBJECT DETECTION BY USING DETECTION THRESHOLD VALUES DERIVED FROM ADDING DIFFERENT OFFSET VALUES TO REFERENCE THRESHOLD VALUES

(71) Applicant: MEDIATEK INC., Hsin-Chu (TW)

(72) Inventors: Li-Ming Wei, Hsin-Chu (TW); Chia-Yu Lin, Hsin-Chu (TW); Chih-Ming Hung, San Jose, CA (US)

(73) Assignee: MEDIATEK INC., Hsin-Chu (TW)

(*) Notice: Subject to any disclaimer, the term of this patent is extended or adjusted under 35 U.S.C. 154(b) by 426 days.

(21) Appl. No.: 16/387,522

(22) Filed: Apr. 17, 2019

(65) Prior Publication Data
US 2020/0333451 A1 Oct. 22, 2020

(51) Int. Cl.
*G01S 13/56* (2006.01)
*G01S 13/58* (2006.01)
(Continued)

(52) U.S. Cl.
CPC .............. *G01S 13/56* (2013.01); *G01S 7/292* (2013.01); *G01S 13/582* (2013.01); *G01S 13/723* (2013.01)

(58) Field of Classification Search
CPC ...... G01S 13/56; G01S 13/582; G01S 13/723; G01S 7/292
See application file for complete search history.

(56) References Cited

U.S. PATENT DOCUMENTS

| 7,336,219 B1 * | 2/2008 | Lohmeier | G01S 13/931 342/21 |
| 2010/0073218 A1 * | 3/2010 | Stockmann | G01S 7/2923 342/146 |

(Continued)

FOREIGN PATENT DOCUMENTS

| CN | 105842685 A | 8/2016 |
| CN | 109031219 A | 12/2018 |
| WO | 2019/063396 A1 | 4/2019 |

OTHER PUBLICATIONS

Wikipedia.org: Constant False Alarm Rate. Oct. 2, 2006 accessed on Mar. 20, 2022 at <https://en.wikipedia.org/w/index.php?title=Constant_false_alarm_rate&oldid=79022525> (Year: 2006).*

*Primary Examiner* — Donald H B Braswell
(74) *Attorney, Agent, or Firm* — Winston Hsu (57) ABSTRACT

An object detection method includes: obtaining a first offset value and a second offset value, setting a first detection threshold value by adding the first offset value to a first reference threshold value, setting a second detection threshold value by adding the second offset value to a second reference threshold value, obtaining a detection input, and performing target detection upon the detection input according to at least the first detection threshold value and the second detection threshold value. The first offset value is different from the second offset value. The first reference threshold value is determined for detecting if at least one object with a first value of an object characteristic exists. The second reference threshold value is determined for detecting if at least one object with a second value of the object characteristic exists. The second value is different from the first value.

24 Claims, 8 Drawing Sheets

(51) Int. Cl.
 *G01S 7/292* (2006.01)
 *G01S 13/72* (2006.01)

(56) References Cited

U.S. PATENT DOCUMENTS

| | | | |
|---|---|---|---|
| 2012/0112955 A1 | 5/2012 | Ando | |
| 2013/0201054 A1* | 8/2013 | Wang | G01S 13/04 342/93 |
| 2019/0162836 A1* | 5/2019 | Bilik | G01S 13/931 |
| 2019/0391251 A1* | 12/2019 | Bharadwaj, Jr. | G01S 7/417 |

* cited by examiner

METHOD AND APPARATUS FOR PERFORMING OBJECT DETECTION BY USING DETECTION THRESHOLD VALUES DERIVED FROM ADDING DIFFERENT OFFSET VALUES TO REFERENCE THRESHOLD VALUES

BACKGROUND

The present invention relates to object detection, and more particularly, to a method and apparatus for performing object detection by using detection threshold values derived from adding different offset values to reference threshold values.

A Radio Detection and Ranging (radar) system refers to electronic equipment that detects the presence of objects by using reflected electromagnetic energy. Specifically, the electronic principle on which the radar system operates is very similar to the principle of sound-wave reflection. The radar system uses electromagnetic energy pulses that are transmitted to and reflected from the reflecting objects. A small portion of the reflected energy returns to the radar system, where this returned energy is called an echo or return. Under some conditions, the radar system can use the echoes/returns to measure the direction, distance, and/or speed of the reflecting objects. However, clutter reflection would cause false alarm easily. In addition, a target object in a far-end range reflects weaker signal power which might lead to missed detection.

Thus, there is a need for an innovative detection threshold design which is capable of improving a false alarm rate and/or a missed detection rate for an object detection apparatus (e.g., a radar system).

SUMMARY

One of the objectives of the claimed invention is to provide a method and apparatus for performing object detection by using detection threshold values derived from adding different offset values to reference threshold values.

According to a first aspect of the present invention, an exemplary object detection method is disclosed. The exemplary object detection method includes: obtaining a first offset value and a second offset value, wherein the first offset value is different from the second offset value; setting a first detection threshold value by adding the first offset value to a first reference threshold value, wherein the first reference threshold value is determined for detecting if of at least one object with a first value of an object characteristic exists; setting a second detection threshold value by adding the second offset value to a second reference threshold value, wherein the second reference threshold value is determined for detecting if of at least one object with a second value of the object characteristic exists, and the second value is different from the first value; obtaining a detection input; and performing, by a processing circuit, target detection upon the detection input according to at least the first detection threshold value and the second detection threshold value.

According to a second aspect of the present invention, an exemplary object detection apparatus is disclosed. The exemplary object detection apparatus includes a wireless receiver and a processing circuit. The wireless receiver is arranged to obtain a detection input. The processing circuit is arranged to obtain a first offset value and a second offset value, seta first detection threshold value by adding the first offset value to a first reference threshold value, set a second detection threshold value by adding the second offset value to a second reference threshold value, and perform target detection upon the detection input according to at least the first detection threshold value and the second detection threshold value. The first offset value is different from the second offset value. The first reference threshold value is determined for detecting if at least one object with a first value of an object characteristic exists. The second reference threshold value is determined for detecting if at least one object with a second value of the object characteristic exists. The second value is different from the first value.

According to a third aspect of the present invention, an exemplary object detection method is disclosed. The exemplary object detection method includes: obtaining detection threshold values by applying threshold adjustment to reference threshold values that are determined for a spectrum of an object characteristic, wherein each of the reference threshold values is determined for detecting if at least one object with a value of the object characteristic exists; obtaining a detection input; and performing, by a processing circuit, target detection upon the detection input according to the detection threshold values. The threshold adjustment is controlled by a first parameter, a second parameter, and a third parameter. The first parameter specifies a number of segments in the spectrum. The second parameter specifies a length or position of each segment. The third parameter specifies an offset value for each segment. At least one of the first parameter, the second parameter, and the third parameter is adjustable.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
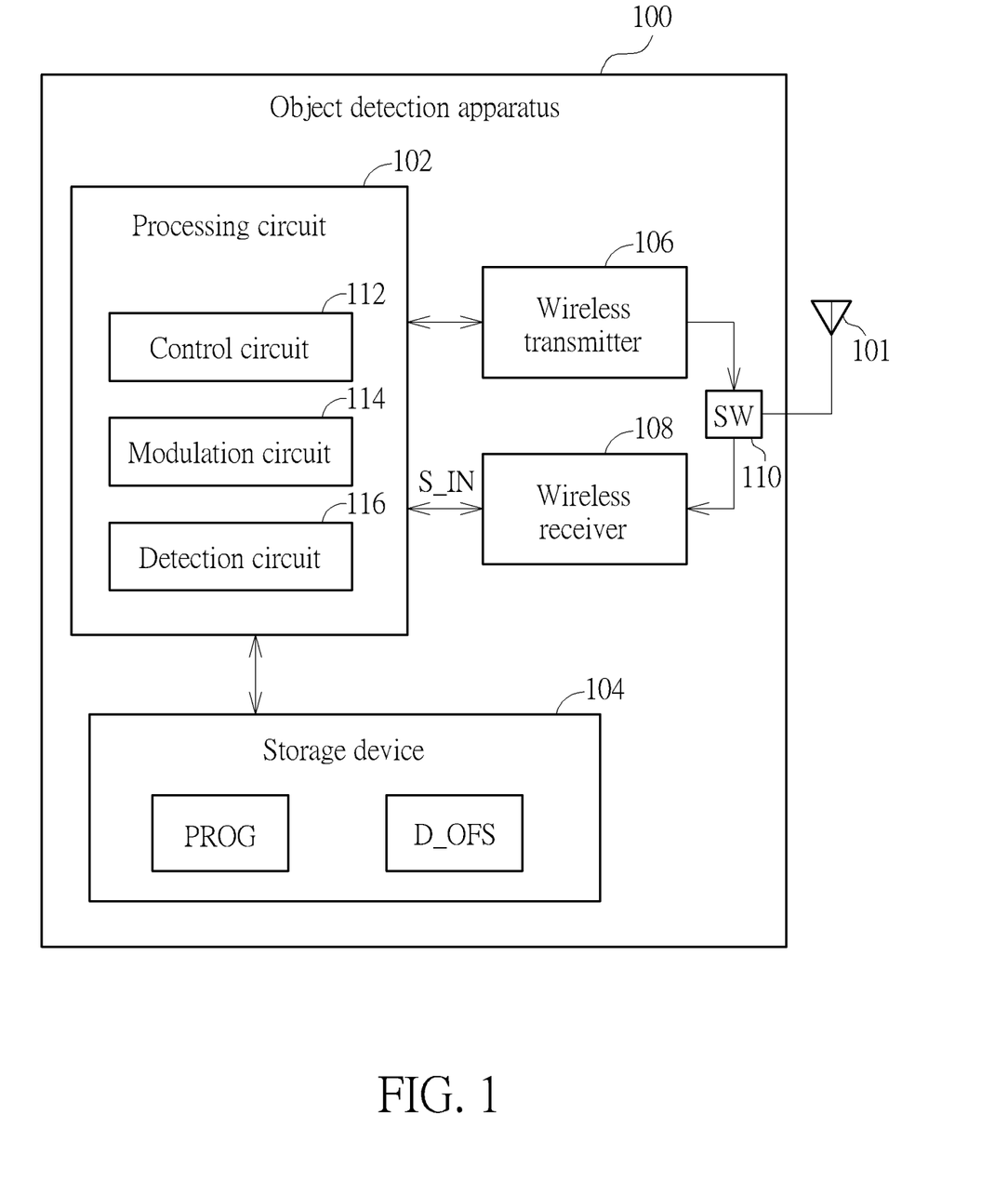
FIG. 1 is a diagram illustrating an object detection apparatus according to an embodiment of the present invention.

FIG. 1 is a diagram illustrating an object detection apparatus according to an embodiment of the present invention. For example, the object detection apparatus 100 may be a radar system such as an automotive radar system. However, this is not meant to be a limitation of the present invention. Any object detection apparatus using the proposed detection threshold design falls within the scope of the present invention. For clarity and simplicity, the following assumes that the object detection apparatus 100 is a radar system. In other words, the terms "object detection apparatus" and "radar system" may be interchangeable. As shown in FIG. 1, the object detection apparatus 100 includes a processing circuit 102, a storage device 104, a wireless transmitter 106, a wireless receiver 108, and a switch circuit (denoted by "SW") 110. The processing circuit 102 includes a control circuit 112, a modulation circuit 114, and a detection circuit 116.

The control circuit 112 is arranged to control operations of the object detection apparatus 100. For example, the wireless transmitter 106 and the wireless receiver 108 may share the same off-chip antenna (e.g., antenna 101) through the switch circuit 110 under the control of the control circuit 112. Specifically, the switch circuit 110 is a transmit/receive (TR) switch that is capable of alternately connecting the wireless transmitter 106 and the wireless receiver 108 to the shared antenna 101. When the object detection apparatus 100 operates under a transmit (TX) mode, the control circuit 112 may turn off the wireless receiver 108, and may further instruct the switch circuit 110 to couple an output port of the wireless transmitter 106 to the antenna 101. When the object detection apparatus 100 operates under a receive (RX) mode, the control circuit 112 may turn off the wireless transmitter 106, and may further instruct the switch circuit 110 to couple an input port of the wireless receiver 108 to the antenna 101.

In a case where the processing circuit 102 is a digital circuit, the wireless transmitter 106 may include a digital-to-analog converter (not shown) for converting a digital baseband output of the processing circuit 102 into an analog baseband input for undergoing up-conversion, and the wireless receiver 108 may include an analog-to-digital converter (not shown) for converting an analog baseband output of down-conversion into a digital baseband input of the processing circuit 102 for further processing.

Modulation techniques play a key role in the radar technology. The mode of transmission makes a huge difference in the performance of the radar system and hence the technique will change as per the application. The two most commonly used techniques are Frequency Modulated Continuous wave (FMCW) and the Pulsed Doppler technique. FMCW is commonly used in industrial applications as well as automotive applications, while in military applications, the Pulsed Doppler is widely accepted. In this embodiment, the modulation circuit 114 is arranged to deal with modulation under the TX mode.

The detection circuit 116 is arranged to deal with demodulation and target detection under the RX mode. In accordance with the proposed detection threshold design, the control circuit 112 is further arranged to instruct the detection circuit 116 to apply different offset values to reference threshold values that are originally determined for target detection and then to use adjusted threshold values for performing target detection upon a detection input S_IN obtained from the wireless receiver 108. Furthermore, the detection circuit 116 may be further arranged to compute the offset values needed by threshold adjustment. Further details of the proposed detection threshold design are described as below with reference to the accompanying drawings.

Figure 2:
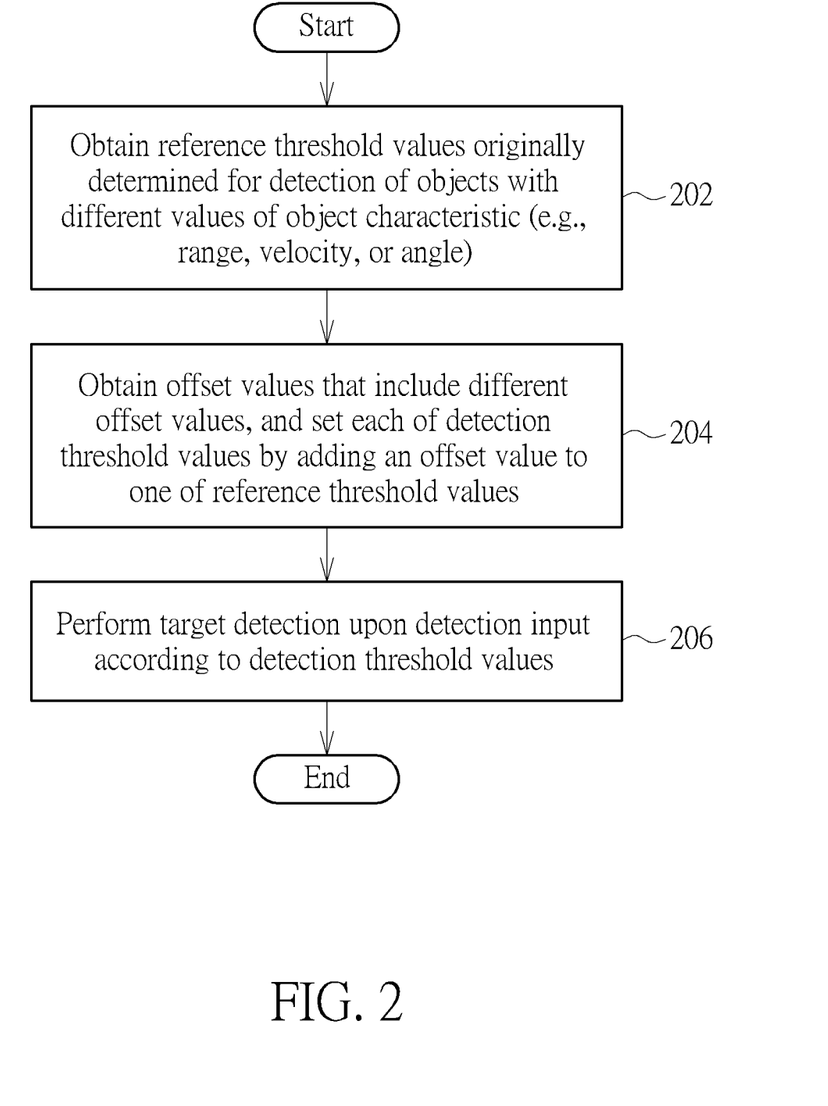
FIG. 2 is a flowchart illustrating an object detection method according to an embodiment of the present invention.

FIG. 2 is a flowchart illustrating an object detection method according to an embodiment of the present invention. The object detection method may be employed by the object detection apparatus 100 (particularly, detection circuit 116 shown in FIG. 1). At step 202, the detection circuit 116 obtains a plurality of reference threshold values originally determined for detecting if objects with different values of an object characteristic exist. For example, a profile may be derived from echoes/returns resulting from transmitting a radar signal that comprises a wide range in frequency, and the reference threshold values can be determined according to the profile and a proper processing scheme such as a constant false-alarm rate (CFAR) based scheme. The object characteristic is associated with a signal strength (i.e., a reflected power level). By way of example, but not limitation, the object characteristic may be an object range, an object velocity, or an object angle.

At step 204, the control circuit 112 instructs the detection circuit 116 to obtain offset values that include different offset values. For example, the detection circuit 116 may obtain offset values from the storage device 104. For another example, the detection circuit 116 may use a function to compute offset values. After instructed by the control circuit 112, the detection circuit 116 sets each detection threshold value that is actually used for target detection by adding an offset value to one reference threshold value obtained at step 202. For example, different offset values are added to reference threshold values, respectively. At step 206, the detection circuit 116 performs target detection upon the detection input S_IN according to the detection threshold values. It should be noted that all of the reference threshold values determined at step 202 are not shifted by the same offset value. Instead, different offset values are involved in adjustment of the reference threshold values determined at step 202.

In one exemplary design, a segment-based scheme may be used for adjusting reference threshold values in a discontinuous manner. For example, a first offset value is different from a second offset value, the same first offset value is applied to each of reference threshold values that are determined for detecting if objects with values within a first segment of an object characteristic exist, and the same second offset value is applied to each of reference threshold values that are determined for detecting if objects with values within a second segment of the object characteristic exist.

Figure 3:
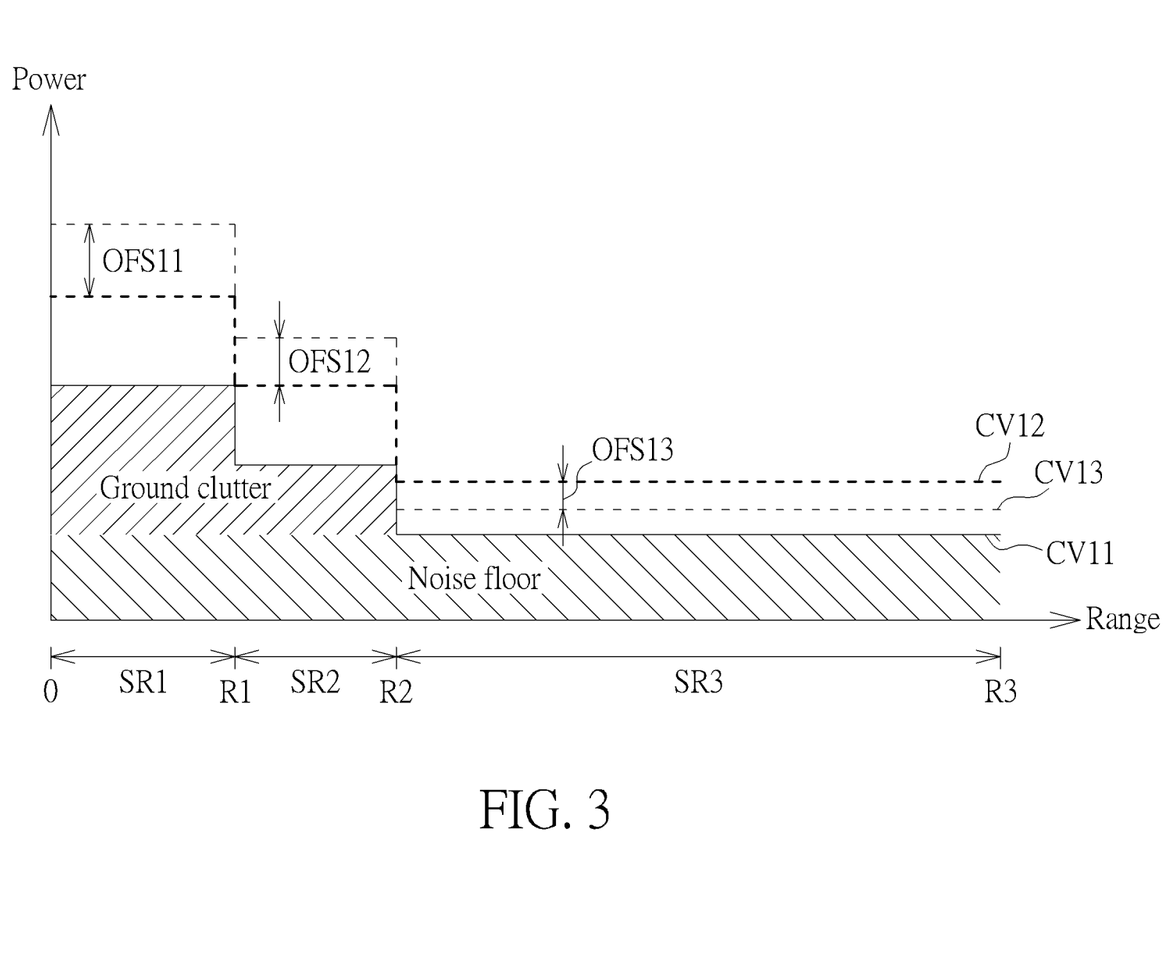
FIG. 3 is a diagram illustrating a first example of adjusting reference threshold values by a segment-based scheme according to an embodiment of the present invention.

FIG. 3 is a diagram illustrating a first example of adjusting reference threshold values by a segment-based scheme according to an embodiment of the present invention. In this example, the object characteristic is an object range, and values of the objective characteristic are different range values. Hence, range-dependent threshold adjustment is performed at the detection circuit 116 for tuning a threshold setting that is actually used for target detection. The characteristic curve CV11 represents an original range spectrum. The characteristic curve CV12 represents reference threshold values before adjustment. The characteristic curve CV13 represents detection threshold values after adjustment. Three parameter settings P1, P2, and P3 may be used to configure the segment-based threshold adjustment. The parameter setting P1 specifies the number of segments. The parameter setting P2 defines the length or position of each segment. The parameter setting P3 defines an offset value for each segment. In this example, the parameter setting P1 defines that the range spectrum is divided into three range segments SR1, SR2, and SR3; the parameter setting P2 defines that the range segment SR1 is between range values 0 and R1, the range segment SR2 is between range values R1 and R2, and the range segment SR3 is between range values R2 and R3; and the parameter setting P3 defines that an offset value OFS11 is assigned to the range segment SR1, an offset value OFS12 is assigned to the range segment SR2, and an offset value OFS13 is assigned to the range segment SR3. In some embodiments of the present invention, at least one of the parameter settings P1, P2, and P3 is adjustable.

According to the original range spectrum derived from a range profile measured by the object detection apparatus 100, reference threshold values are determined by the detection circuit 116. One reference threshold value may be determined for detecting if at least one object with a specific range value exists. Hence, reference threshold values associated with the range segment SR1 are determined for detecting if objects with range values included in the range segment SR1 exist, reference threshold values associated with the range segment SR2 are determined for detecting if objects with range values included in the range segment SR2 exist, and reference threshold values associated with the range segment SR3 are determined for detecting if objects with range values included in the range segment SR3 exist. In this example, reference threshold values associated with the range segment SR1 are set by a same value, reference threshold values associated with the range segment SR2 are set by a same value, and reference threshold values associated with the range segment SR3 are set by a same value. However, this is for illustrative purposes only, and is not meant to be a limitation of the present invention.

The offset values OFS11-OFS13 are different from one another. For example, at least one of the offset values OFS11-OFS13 may be a non-positive value, and at least another one of the offset values OFS11-OFS13 may be a non-negative value. In this example, the offset value OFS11 (which is a positive value) is larger than the offset value OFS12 (which is a positive value), and the offset value OFS12 (which is a positive value) is larger than the offset value OFS13 (which is a negative value). The positive offset value OFS11 is applied to the near-end range segment SR1. Hence, each reference threshold value originally determined for target detection in the range segment SR1 is increased by the positive offset value OFS11. As indicated by the characteristic curve CV13, detection threshold values actually used for target detection in the range segment SR1 are much higher than the power level of clutter reflection in the range segment SR1. In this way, the false alarm caused by the clutter reflection from the road surface in the near-end range can be reduced or avoided. The positive offset value OFS12 is applied to the middle range segment SR2. Hence, each reference threshold value originally determined for target detection in the range segment SR2 is increased by the positive offset value OFS12 (OFS12<OFS11). As indicated by the characteristic curve CV13, detection threshold values actually used for target detection in the range segment SR2 are much higher than the power level of clutter reflection in the range segment SR2. In this way, the false alarm caused by the clutter reflection from the road surface in the middle range can be reduced or avoided. The negative offset value OFS13 is applied to the far-end range segment SR3. Hence, each reference threshold value originally determined for target detection in the range segment SR3 is decreased by the negative offset value OFS13. As indicated by the characteristic curve CV13, detection threshold values actually used for target detection in the far-end range are capable of detecting objects with weaker reflection signal power. In this way, missed detection in the far-end range can be mitigated.

It is possible that there are multiple objects located at the same range/distance away from the object detection apparatus 100. The object detection apparatus 100 may distinguish between objects at the same range/distance by referring to other object characteristic(s). For example, two objects that are found at the same range/distance but different moving speeds may be identified by the object detection apparatus 100 through measuring velocity values of the objects. For another example, two objects that are found at the same range/distance but different directions may be identified by the object detection apparatus 100 through measuring angle values of the objects.

Figure 4:
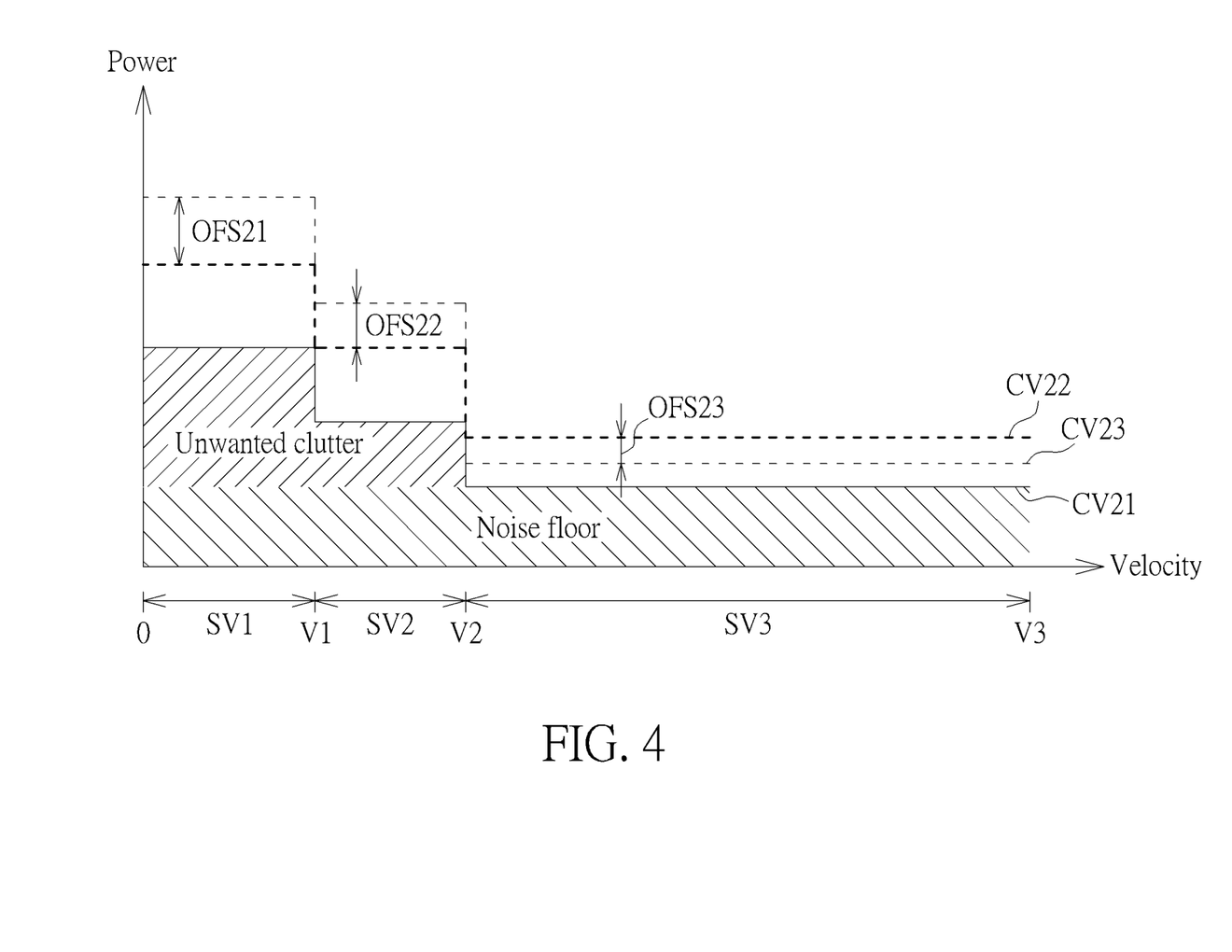
FIG. 4 is a diagram illustrating a second example of adjusting reference threshold values by a segment-based scheme according to an embodiment of the present invention.

FIG. 4 is a diagram illustrating a second example of adjusting reference threshold values by a segment-based scheme according to an embodiment of the present invention. In this example, the object characteristic is an object velocity, and values of the objective characteristic are different velocity values. Hence, velocity-dependent threshold adjustment is performed at the detection circuit 116 for tuning a threshold setting that is actually used for target detection. The characteristic curve CV21 represents an original velocity spectrum for one selected range/distance. The characteristic curve CV22 represents reference threshold values before adjustment. The characteristic curve CV23 represents detection threshold values after adjustment. Like the example shown in FIG. 3, three parameter settings P1, P2, and P3 may be used to configure the segment-based threshold adjustment, where the parameter setting P1 specifies the number of segments, the parameter setting P2 defines the length or position of each segment, and the parameter setting P3 defines an offset value for each segment. In this example, the parameter setting P1 defines that the velocity spectrum is divided into three velocity segments SV1, SV2, and SV3; the parameter setting P2 defines that the velocity segment SV1 is between velocity values 0 and V1, the velocity segment SV2 is between velocity values V1 and V2, and the velocity segment SV3 is between velocity values V2 and V3; and the parameter setting P3 defines that an offset value OFS21 is assigned to the velocity segment SV1, an offset value OFS22 is assigned to the velocity segment SV2, and an offset value OFS23 is assigned to the velocity segment SV3. In some embodiments of the present invention, at least one of the parameter settings P1, P2, and P3 is adjustable.

According to the original velocity spectrum derived from a velocity profile measured by the object detection apparatus 100 for one selected range/distance, the reference threshold values are determined by the detection circuit 116. One reference threshold value may be determined for detecting if at least one object with a velocity value at the selected range/distance exists. Hence, reference threshold values associated with the velocity segment SV1 are determined for detecting if objects with velocity values included in the velocity segment SV1 exist, reference threshold values associated with the velocity segment SV2 are determined for detecting if objects with velocity values included in the velocity segment SV2 exist, and reference threshold values associated with the velocity segment SV3 are determined for detecting if objects with velocity values included in the velocity segment SV3 exist. In this example, reference threshold values associated with the velocity segment SV1 are set by a same value, reference threshold values associated with the velocity segment SV2 are set by a same value, and reference threshold values associated with the velocity segment SV3 are set by a same value. However, this is for illustrative purposes only, and is not meant to be a limitation of the present invention.

The offset values OFS21-OFS23 are different from one another. For example, at least one of the offset values OFS21-OFS23 may be a non-positive value, and at least another one of the offset values OFS21-OFS23 may be a non-negative value. In this example, the offset value OFS21 (which is a positive value) is larger than the offset value OFS22 (which is a positive value), and the offset value OFS22 (which is a positive value) is larger than the offset value OFS23 (which is a negative value). The positive offset value OFS21 is applied to the low velocity segment SR1. Hence, each reference threshold value originally determined for target detection in the velocity segment SV1 is increased by the positive offset value OFS21. Compared to the reflected signal energy of a high-speed object, the reflected signal energy of a low-speed object is less spread. As indicated by the characteristic curve CV23, detection threshold values actually used for target detection in the velocity segment SV1 are much higher than the power level of unwanted clutter in the velocity segment SV1. In this way, the false alarm caused by unwanted clutter at a low speed can be reduced or avoided. The positive offset value OFS22 is applied to the medium velocity segment SV2. Hence, each reference threshold value originally determined for target detection in the velocity segment SV2 is increased by the positive offset value OFS22 (OFS22<OFS21). As indicated by the characteristic curve CV23, detection threshold values actually used for target detection in the velocity segment SV2 are much higher than the power level of unwanted clutter in the velocity segment SV2. In this way, the false alarm caused by unwanted clutter at a medium speed can be reduced or avoided. The negative offset value OFS23 is applied to the high velocity segment SV3. Hence, each reference threshold value originally determined for target detection in the velocity segment SV3 is decreased by the negative offset value OFS13. As indicated by the characteristic curve CV23, detection threshold values actually used for target detection in the velocity segment SV3 are capable of detecting high-speed objects that have weaker reflection signal power due to energy spreading. In this way, missed detection in the velocity segment SV3 can be mitigated.

Figure 5:
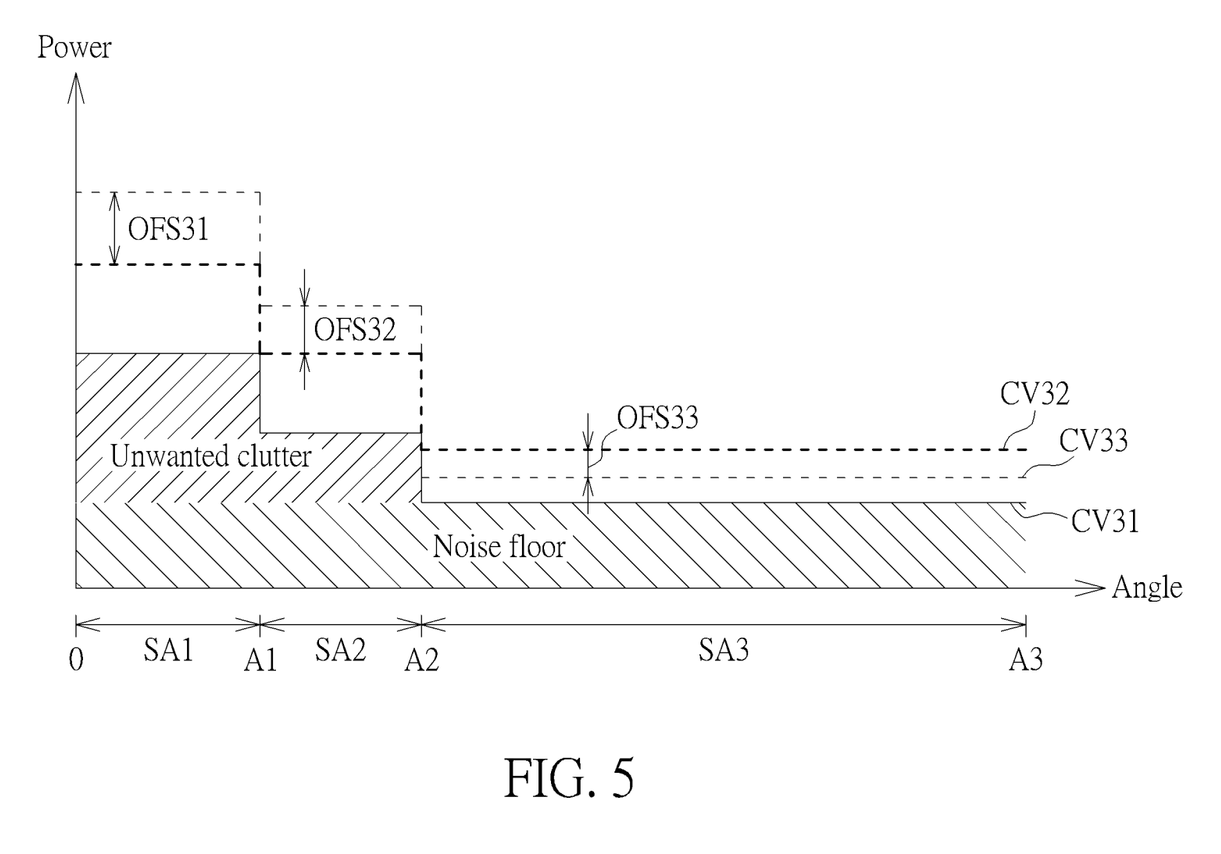
FIG. 5 is a diagram illustrating a third example of adjusting reference threshold values by a segment-based scheme according to an embodiment of the present invention.

FIG. 5 is a diagram illustrating a third example of adjusting reference threshold values by a segment-based scheme according to an embodiment of the present invention. In this example, the object characteristic is an object angle, and values of the objective characteristic are different angle values. Hence, angle-dependent threshold adjustment is performed at the detection circuit 116 for tuning a threshold setting that is actually used for target detection. The characteristic curve CV31 represents an original angle spectrum for one selected range/distance. The characteristic curve CV32 represents reference threshold values before adjustment. The characteristic curve CV33 represents detection threshold values after adjustment. Like the example shown in FIG. 3, three parameter settings P1, P2, and P3 may be used to configure the segment-based threshold adjustment, where the parameter setting P1 specifies the number of segments, the parameter setting P2 defines the length or position of each segment, and the parameter setting P3 defines an offset value for each segment. In this example, the parameter setting P1 defines that the angle spectrum is divided into three angle segments SA1, SA2, and SA3; the parameter setting P2 defines that the angle segment SA1 is between angle values 0 and A1, the angle segment SA2 is between angle values A1 and A2, and the angle segment SA3 is between angle values A2 and A3; and the parameter setting P3 defines that an offset value OFS31 is assigned to the angle segment SA1, an offset value OFS32 is assigned to the angle segment SA2, and an offset value OFS33 is assigned to the angle segment SA3. In some embodiments of the present invention, at least one of the parameter settings P1, P2, and P3 is adjustable.

According to the original angle spectrum derived from an angle profile measured by the object detection apparatus 100 for one selected range/distance, the reference threshold values are determined by the detection circuit 116. One reference threshold value may be determined for detecting if at least one object with an angle value at the selected range/distance exists. Hence, reference threshold values associated with the angle segment SA1 are determined for detecting if objects with angle values included in the angle segment SA1 exist, reference threshold values associated with the angle segment SA2 are determined for detecting if objects with angle values included in the angle segment SA2 exist, and reference threshold values associated with the angle segment SA3 are determined for detecting if objects with angle values included in the angle segment SA3 exist. In this example, reference threshold values associated with the angle segment SA1 are set by a same value, reference threshold values associated with the angle segment SA2 are set by a same value, and reference threshold values associated with the angle segment SA3 are set by a same value. However, this is for illustrative purposes only, and is not meant to be a limitation of the present invention.

The offset values OFS3*l*-OFS33 are different from one another. For example, at least one of the offset values OFS3*l*-OFS33 may be a non-positive value, and at least another one of the offset values OFS3*l*-OFS33 may be a non-negative value. In this example, the offset value OFS3*l* (which is a positive value) is larger than the offset value OFS32 (which is a positive value), and the offset value OFS32 (which is a positive value) is larger than the offset value OFS33 (which is a negative value). The positive offset value OFS3*l* is applied to the small angle segment SA1. Hence, each reference threshold value originally determined for target detection in the angle segment SA1 is increased by the positive offset value OFS11. The positive offset value OFS32 is applied to the medium angle segment SA2. Hence, each reference threshold value originally determined for target detection in the angle segment SA2 is increased by the positive offset value OFS32 (OFS32<OFS31). The negative offset value OFS33 is applied to the large angle segment SA3. Hence, each reference threshold value originally determined for target detection in the angle segment SA3 is decreased by the negative offset value OFS33. The offset settings shown in FIG. 5 are for illustrative purposes only, and are not meant to be limitations of the present invention. For example, the antenna gain should be smaller in a region of a larger angle, and the power reflection from the larger angle should be smaller. Hence, for an object with a larger angle value, a reference threshold value may be adjusted by an offset value to be smaller or even negative.

In another exemplary design, a function-based scheme may be used for adjusting reference threshold values in a continuous manner. For example, a first offset value is computed by a function that uses a first value of an object characteristic (e.g., range, velocity, or angle) as one input, a second offset value is computed by the function that uses a second value of the object characteristic (e.g., range, velocity, or angle) as one input, the first offset value computed for the first value of the object characteristic is applied to a first reference threshold value (which is originally determined for detecting if at least one object with the first value of the object characteristic exists) only, and the second offset value computed for the second value of the object characteristic is applied to a second reference threshold value (which is originally determined for detecting if at least one object with the second value of the object characteristic exists) only.

Figure 6:
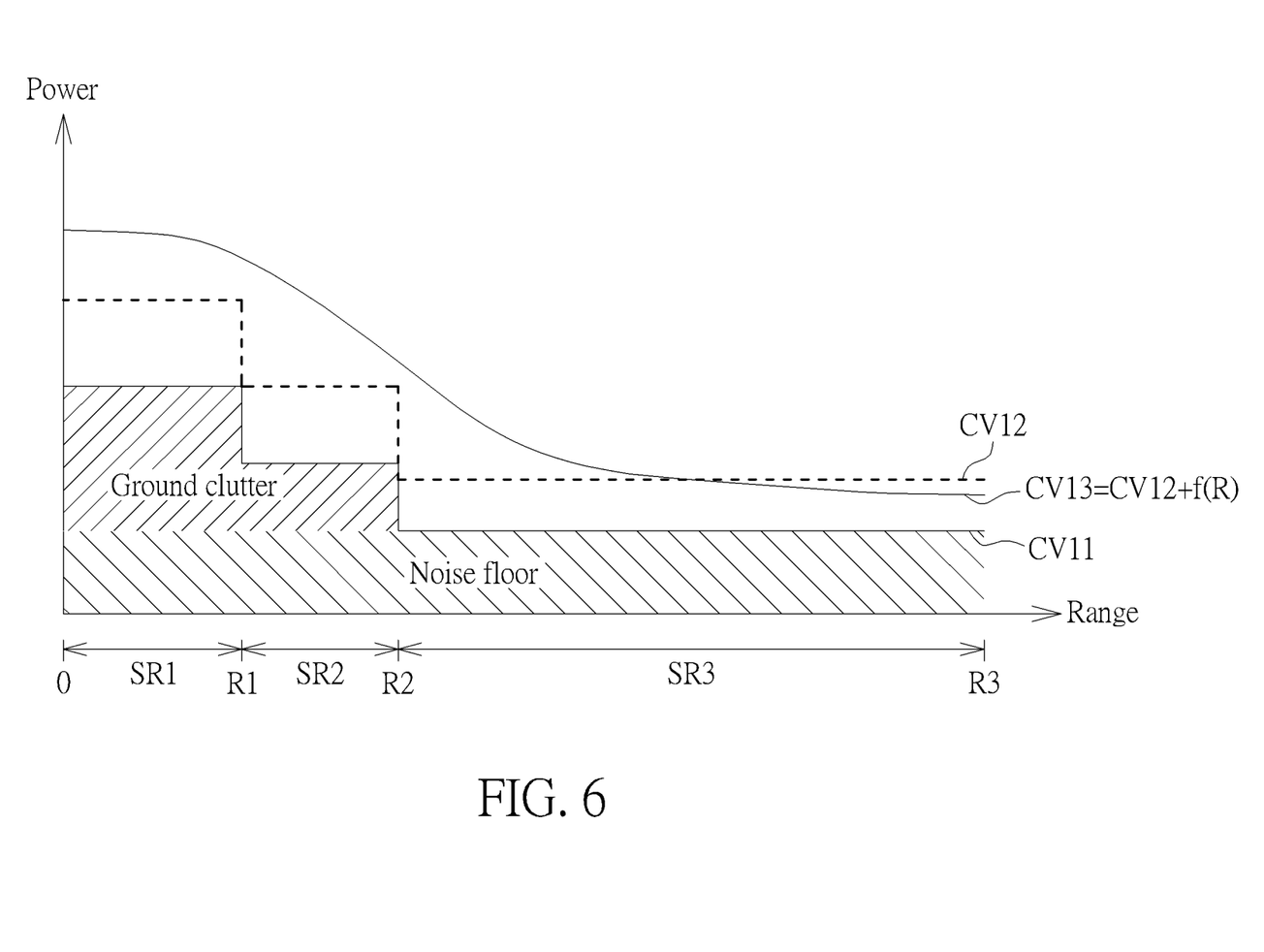
FIG. 6 is a diagram illustrating a first example of adjusting reference threshold values by a function-based scheme according to an embodiment of the present invention.

FIG. 6 is a diagram illustrating a first example of adjusting reference threshold values by a function-based scheme according to an embodiment of the present invention. In this example, the object characteristic is an object range, and values of the objective characteristic are different range values. Hence, range-dependent threshold adjustment is performed at the detection circuit 116 for tuning a threshold setting that is actually used for target detection. An offset value for a reference threshold value that is originally determined for detecting if at least one object with a range value R exists is computed by a function f using the range value R as one input. In this example, an offset value is set by f(R), where R is any range value within {0, R3}. The characteristic curve CV13 represents detection threshold values after adjustment, and can be regarded as a summation of offset values f(R) and associated reference threshold values (which are represented by the characteristic curve CV12).

Figure 7:
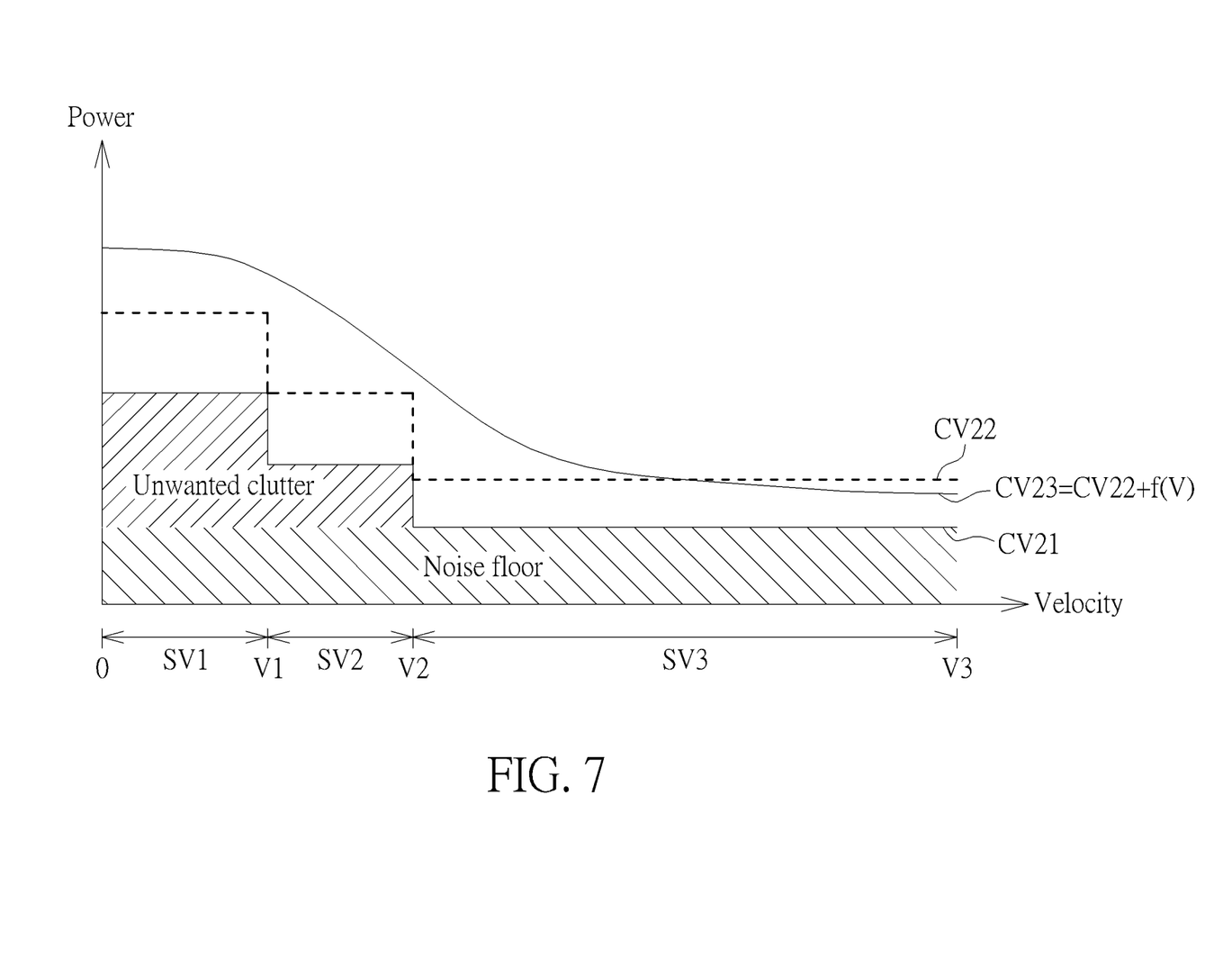
FIG. 7 is a diagram illustrating a second example of adjusting reference threshold values by a function-based scheme according to an embodiment of the present invention.

FIG. 7 is a diagram illustrating a second example of adjusting reference threshold values by a function-based scheme according to an embodiment of the present invention. In this example, the object characteristic is an object velocity, and values of the objective characteristic are different velocity values. Hence, velocity-dependent threshold adjustment is performed at the detection circuit 116 for tuning a threshold setting that is actually used for target detection. An offset value for a reference threshold value that is originally determined for detecting if at least one object with a velocity value V exists is computed by a function f using the velocity value V as one input. In this example, an offset value is set by f(V), where V is any velocity value within {0, V3}. The characteristic curve CV23 represents detection threshold values after adjustment, and can be regarded as a summation of offset values f(V) and associated reference threshold values (which are represented by the characteristic curve CV22).

Figure 8:
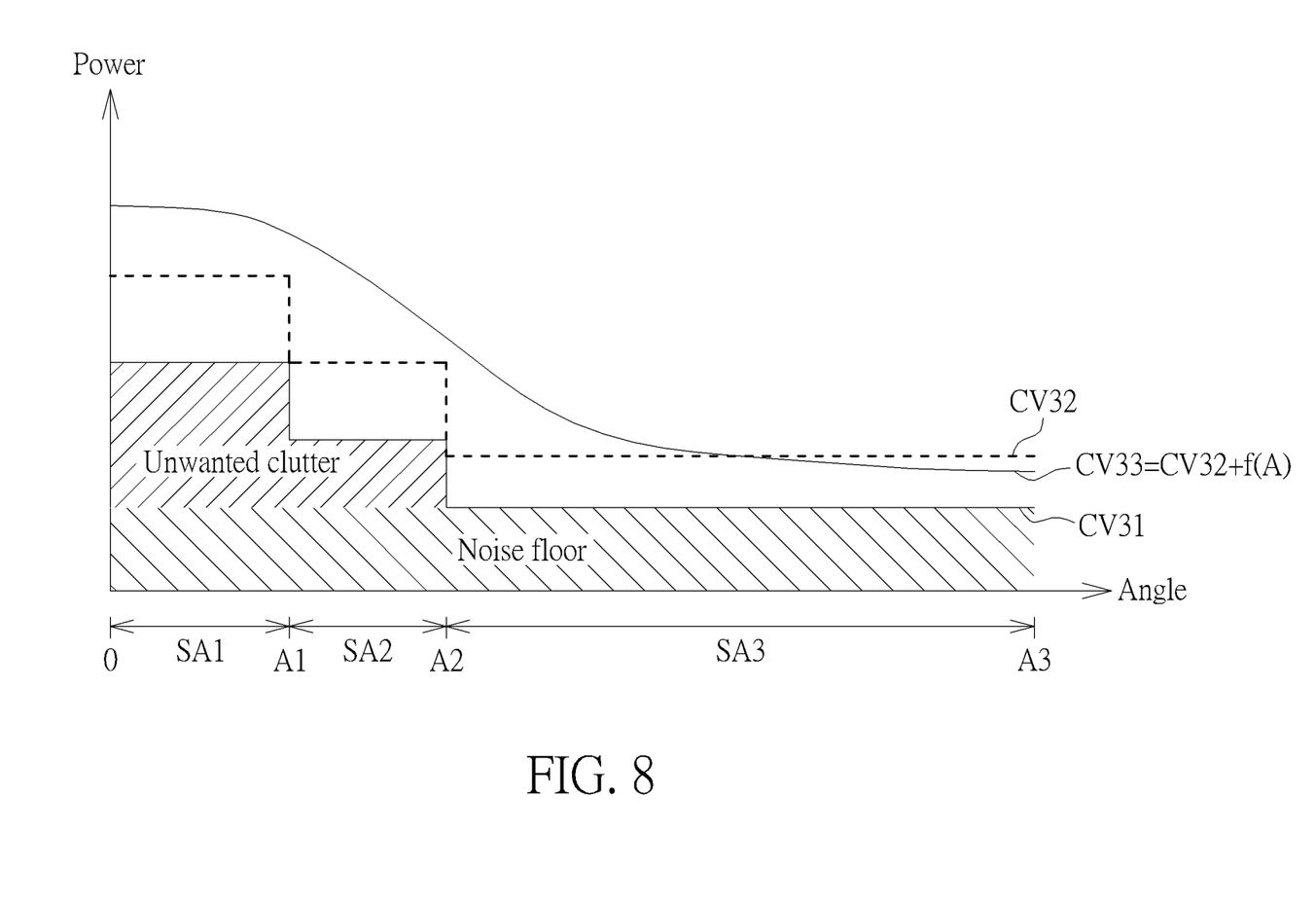
FIG. 8 is a diagram illustrating a third example of adjusting reference threshold values by a function-based scheme according to an embodiment of the present invention.

FIG. 8 is a diagram illustrating a third example of adjusting reference threshold values by a function-based scheme according to an embodiment of the present invention. In this example, the object characteristic is an object angle, and values of the objective characteristic are different angle values. Hence, angle-dependent threshold adjustment is performed at the detection circuit 116 for tuning a threshold setting that is actually used for target detection. An offset value for a reference threshold value that is originally determined for detecting if at least one object with an angle value A exists is computed by a function f using the angle value A as one input. In this example, an offset value is set by f(A), where A is any angle value within {0, A3}. The characteristic curve CV33 represents detection threshold values after adjustment, and can be regarded as a summation of offset values f(A) and associated reference threshold values (which are represented by the characteristic curve CV32).

As mentioned above, the detection circuit 116 may obtain offset values according to the segment-based scheme that enables discontinuous threshold adjustment, or may compute offset values according to the function-based scheme that enables continuous threshold adjustment. In some embodiment of the present invention, offset values are written into the storage device 104. As shown in FIG. 1, the storage device 104 stores offset data D OFS that is a collection of offset values. Hence, after determining reference threshold values, the detection circuit 116 may read the offset data D OFS from the storage device 104, and may obtain detection threshold values actually used for target detection by updating the reference threshold values according to the offset data D OFS (which may contain different offset values). For example, the storage device 104 may be an on-chip memory.

In one exemplary implementation, the processing circuit 102 may be implemented by dedicated hardware. Hence, each of control circuit 112, modulation circuit 114, and detection circuit 116 is arranged to perform its designated function by using hardware only.

In another exemplary implementation, the processing circuit 102 may be implemented by a processor such as an on-chip microcontroller unit (MCU). Hence, each of control circuit 112, modulation circuit 114, and detection circuit 116 is arranged to perform its designated function by reading a program code PROG from the storage device 104 and running the program code PROG on the processor, where the program code PROG includes processor-executable instruction(s).

In yet another exemplary implementation, the processing circuit 102 may be a hybrid circuit that is implemented by a combination of dedicated hardware and a processor. For example, the control circuit 112 may perform one part of its designated function by using hardware only and may perform another part of its designated function by running the program code PROG on the processor, the modulation circuit 114 may perform one part of its designated function by using hardware only and may perform another part of its designated function by running the program code PROG on the processor, and/or the detection circuit 116 may perform one part of its designated function by using hardware only and may perform another part of its designated function by running the program code PROG on the processor. For another example, at least one of control circuit 112, modulation circuit 114, and detection circuit 116 may perform its designated function by using hardware only, and at least one of control circuit 112, modulation circuit 114, and detection circuit 116 may perform its designated function by reading the program code PROG from the storage device 104 and running the program code PROG on the processor.

The detection threshold values generated by adding a same offset value to all reference threshold values can only detect the target above a fixed signal-to-noise ratio (SNR). To address this issue, the present invention proposes an algorithm-based solution that adopts different offset values for achieving range-dependent threshold adjustment, adopts different offset values for achieving velocity-dependent threshold adjustment, and/or adopts different offset values for achieving angle-dependent threshold adjustment. The spectrum can be divided into segments as desired, and a target object with a specific SNR can be detected at each segment. The proposed threshold adjustment scheme has low computation complexity and can be implemented easily.

In addition, the proposed threshold adjustment scheme has a high degree of flexibility due to the fact that various tuning options can be used to configure the segment-based scheme (which is used for discontinuous threshold adjustment) and the function-based scheme (which is used for continuous threshold adjustment). Furthermore, the proposed threshold adjustment scheme is capable of improving a false alarm rate and a missed detection rate.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An object detection method comprising:
   obtaining a first offset value and a second offset value, wherein the first offset value is different from the second offset value;
   before adding the first offset value to a first reference threshold value, determining the first reference threshold value according to a profile derived from echoes resulting from transmitting a radar signal;
   before adding the second offset value to a second reference threshold value, determining the second reference threshold value according to the same profile derived from the echoes resulting from transmitting the radar signal;
   setting a first detection threshold value by adding the first offset value to the first reference threshold value, wherein the first reference threshold value is determined for detecting if at least one object with a first value of an object characteristic exists;
   setting a second detection threshold value by adding the second offset value to the second reference threshold value, wherein the second reference threshold value is determined for detecting if at least one object with a second value of the object characteristic exists, and the second value is different from the first value;
   transmitting, by a wireless transmitter, electromagnetic energy pulses;
   obtaining, by a wireless receiver, a detection input according to at least one echo resulting from reflection of the electromagnetic energy pulses; and
   utilizing at least the first detection threshold value and the second detection threshold value in target detection performed upon the detection input, wherein the first detection threshold value is utilized by the target detection to detect if at least one object with the first value of the object characteristic exists, and the second detection threshold value is utilized by the target detection to detect if at least one object with the second value of the object characteristic exists;
   wherein one of the first offset value and the second offset value is a non-positive value.

2. The object detection method of claim 1, wherein the object detection method is employed by a Radio Detection and Ranging (radar) system, and the processing circuit is a part of the radar system.

3. The object detection method of claim 1, wherein the object characteristic is associated with a signal strength.

4. The object detection method of claim 3, wherein the object characteristic is an object range, and the first value and the second value are different range values.

5. The object detection method of claim 3, wherein the object characteristic is an object velocity, and the first value and the second value are different velocity values.

6. The object detection method of claim 3, wherein the object characteristic is an object angle, and the first value and the second value are different angle values.

7. The object detection method of claim 1, wherein the second value is larger than the first value, and the first offset value is larger than the second offset value.

8. The object detection method of claim 1, wherein another of the first offset value and the second offset value is a non-negative value.

9. The object detection method of claim 8, wherein the second value is larger than the first value, the first offset value is a positive value, and the second offset value is a negative value.

10. The object detection method of claim 1, wherein the same first offset value is applied to each of reference threshold values that are determined for detecting if objects with values within a first segment of the object characteristic exist, and the same second offset value is applied to each of reference threshold values that are determined for detecting if objects with values within a second segment of the object characteristic exist.

11. The object detection method of claim 1, wherein the first offset value is computed by a function that uses the first value as one input, the second offset value is computed by the function that uses the second value as one input, the first offset value computed for the first value is applied to the first reference threshold value only, and the second offset value computed for the second value is applied to the second reference threshold value only.

12. An object detection apparatus comprising:
   a wireless transmitter, arranged to transmit electromagnetic energy pulses;
   a wireless receiver, arranged to obtain a detection input according to at least one echo resulting from reflection of the electromagnetic energy pulses; and
   a processing circuit, arranged to obtain a first offset value and a second offset value, determine a first reference threshold value according to a profile derived from echoes resulting from transmitting a radar signal before adding the first offset value to the first reference threshold value, determine a second reference threshold value according to the same profile derived from the echoes resulting from transmitting the radar signal before adding the second offset value to the second reference threshold value, set a first detection threshold value by adding the first offset value to the first reference threshold value, set a second detection threshold value by adding the second offset value to the second reference threshold value, and utilize at least the first detection threshold value and the second detection threshold value in target detection performed upon the detection input by the processing circuit, wherein the first detection threshold value is utilized by the target detection to detect if at least one object with the first value of the object characteristic exists, and the second detection threshold value is utilized by the target detection to detect if at least one object with the second value of the object characteristic exists;
   wherein the first offset value is different from the second offset value, the first reference threshold value is determined for detecting if at least one object with a first value of an object characteristic exists, the second reference threshold value is determined for detecting if at least one object with a second value of the object characteristic, and the second value is different from the first value; and wherein one of the first offset value and the second offset value is a non-positive value.

13. The object detection apparatus of claim 12, wherein the object detection apparatus is a Radio Detection and Ranging (radar) system.

14. The object detection apparatus of claim 12, wherein the object characteristic is associated with a signal strength.

15. The object detection apparatus of claim 14, wherein the object characteristic is an object range, and the first value and the second value are different range values.

16. The object detection apparatus of claim 14, wherein the object characteristic is an object velocity, and the first value and the second value are different velocity values.

17. The object detection apparatus of claim 14, wherein the object characteristic is an object angle, and the first value and the second value are different angle values.

18. The object detection apparatus of claim 12, wherein the second value is larger than the first value, and the first offset value is larger than the second offset value.

19. The object detection apparatus of claim 12, wherein another of the first offset value and the second offset value is a non-negative value.

20. The object detection apparatus of claim 19, wherein the second value is larger than the first value, the first offset value is a positive value, and the second offset value is a negative value.

21. The object detection apparatus of claim 12, wherein the processing circuit applies the same first offset value to each of reference threshold values that are determined for detecting if objects with values within a first segment of the object characteristic exist, and applies the same second offset value to each of reference threshold values that are determined for detecting if objects with values within a second segment of the object characteristic exist.

22. The object detection apparatus of claim 12, wherein the processing circuit computes the first offset value by a function that uses the first value as one input, and computes the second offset value by the function that uses the second value as one input, the first offset value computed for the first value is applied to the first reference threshold value only, and the second offset value computed for the second value is applied to the second reference threshold value only.

23. An object detection method comprising:
obtaining detection threshold values by applying threshold adjustment to reference threshold values that are determined for a spectrum of an object characteristic, wherein each of the reference threshold values is determined for detecting if at least one object with a value of the object characteristic exists;
transmitting, by a wireless transmitter, electromagnetic energy pulses;
obtaining, by a wireless receiver, a detection input according to at least one echo resulting from reflection of the electromagnetic energy pulses; and
utilizing the detection threshold values in target detection performed upon the detection input, wherein each of the detection threshold values is utilized by the target detection to detect if at least one object with a value of the object characteristic exists;
wherein the threshold adjustment is controlled by a first parameter, a second parameter, and a third parameter, the first parameter specifies a number of segments in the spectrum, each segment in the spectrum is adjacent to at least one segment in the spectrum and does not overlap said at least one segment, the second parameter specifies a length or position of said each segment, the third parameter specifies an offset value for said each segment, and at least one of the first parameter, the second parameter, and the third parameter that configure the threshold adjustment is adjustable, where before the threshold adjustment is applied to the reference threshold values, the reference threshold values are determined according to a same profile derived from echoes resulting from transmitting a radar signal.

24. The object detection method of claim 23, wherein the number of segments specified by the first parameter is equal to a number of different offset values specified by the third parameter.

* * * * *